United States Patent [19]

Chen et al.

[11] Patent Number: 5,751,378
[45] Date of Patent: May 12, 1998

[54] SCENE CHANGE DETECTOR FOR DIGITAL VIDEO

[75] Inventors: Xuemin Chen; Vincent Liu, both of San Diego, Calif.

[73] Assignee: General Instrument Corporation, Horsham, Pa.

[21] Appl. No.: 722,468

[22] Filed: Sep. 27, 1996

[51] Int. Cl.$^6$ .................................................. H04N 9/77
[52] U.S. Cl. ................................... 348/700; 348/699
[58] Field of Search .............................. 348/700, 699, 348/405, 412, 415, 416; H04N 9/77

[56] References Cited

U.S. PATENT DOCUMENTS

| | | | |
|---|---|---|---|
| 4,823,184 | 4/1989 | Belmares et al. | 348/700 |
| 5,404,174 | 4/1995 | Sugahara | 348/700 |
| 5,493,345 | 2/1996 | Ishikawa et al. | 348/700 |
| 5,589,884 | 12/1996 | Ohguchi | 348/700 |
| 5,617,149 | 4/1997 | Lee et al. | 348/700 |
| 5,625,417 | 4/1997 | Lee | 348/699 |
| 5,642,174 | 6/1997 | Kazui et al. | 348/699 |
| 5,642,239 | 6/1997 | Nagai | 348/700 |

FOREIGN PATENT DOCUMENTS 404345382  12/1992  Japan ................. 348/700

OTHER PUBLICATIONS

Chen et al., Scene Adaptive Coder, IEE Transactions on Communications, vol. Com-32, No. 3, Mar. 1984.

*Primary Examiner*—Tommy P. Chin
*Assistant Examiner*—LuAnne P. Din
*Attorney, Agent, or Firm*—Barry R. Lipsitz; Ralph F. Hoppin

[57] ABSTRACT

In a method for detecting a scene change between a prior video picture and a current video picture of a sequence of pictures, an average luminance value is determined for a block pair of the prior and current video pictures. Preferably, the blocks of the block pair are located, respectively, in the same relative position in the prior and current pictures. An incremental visual sensation value is determined using a difference between the average luminance values. If the incremental visual sensation value exceeds a block contrast threshold level, a scene change is indicated. In particular, if the minimum of the average luminance values of the current and prior picture blocks exceeds a dark scene threshold, the incremental visual sensation value is determined using the ratio of (a) the absolute value of the difference between the average luminance values, and (b) the minimum of the average luminance values of the current and prior picture blocks. Otherwise, the incremental visual sensation value is determined using the ratio of (a) the absolute value of the difference, and (b) the dark scene threshold. The method may be optimized by adjusting the block size based on the relative amount of motion and the current picture type.

19 Claims, 2 Drawing Sheets

SCENE CHANGE DETECTOR FOR DIGITAL VIDEO

BACKGROUND OF THE INVENTION

The present invention relates to an apparatus and method for detecting scene changes in a sequence of digital video frames (e.g., pictures). In particular, changes in luminance in different blocks of a video frame relative to corresponding blocks in a previous frame are used to provide a reliable indication of a scene change.

Recently, digital video transmission formats have become increasingly popular for providing television and other audio, video, and/or data services to consumers' homes. Such programming can be transmitted to a consumer's home via a direct broadcast satellite link, or via a cable television network. In addition to providing new and expanded program offerings, digital video can provide a higher image quality than traditional analog television broadcasts.

In order to transmit digital video signals within available bandwidths, it is necessary to use data compression techniques. In particular, spatial compression techniques take advantage of correlations between neighboring pixels or blocks of pixels in a frame, while temporal techniques take advantage of correlations between pixels or blocks of pixels in successive video frames. Moreover, motion compensation techniques can provide even greater temporal compression.

However, in order to provide optimal compression of a sequence of video frames, it is desirable to have the capability to detect scene changes in the sequence. A scene change can be defined generally as any significant change in the composition of the frame. For example, in a video sequence of a movie, a scene change may occur when the camera angle is changed, or when there is a switch between a close-up view and a panoramic view. Moreover, often times a scene change is indicated by a noticeable change in the luminance level between successive video frames. For example, a scene change may occur when a bright light is switched on in a dark room.

Once a scene change has been detected, the encoding of the video sequence may be modified accordingly. For example, motion compensation may be temporarily suspended when a scene change is detected since there is a reduced probability of temporal correlation between the first frame of the new scene and the last frame of the previous scene. Moreover, a specific type of picture (e.g., I, P, or B picture) may be selected based on scene change information. I, P and B pictures are defined by the MPEG-2 standard as discussed in greater detail below.

Various existing scene detection systems attempt to provide reliable scene change detection. For example, one system uses the sum of the absolute value of the difference of corresponding pixel values between the current frame and the previous frame, and compares this sum with a predetermined constant threshold to determine whether there is a scene change. However, this system may fail to give reliable results if a fast motion occurs in successive frames. Furthermore, such a system is not consistently reliable when different levels of motion are present (e.g., moderately fast, fast, very fast).

Another system determines the absolute value of the difference between corresponding pixel values between the current frame and the previous frame. Then, the absolute value of the difference of the corresponding pixel values between the current frame and the next frame is determined. Finally, the sum of the difference of the above two differences is obtained and compared with a predetermined constant threshold to determine whether there is a scene change. However, this system may not provide reliable results when the scene transitions from no motion to fast motion.

Accordingly, it would be desirable to provide a scene detection system for digital video which can reliably detect scene changes when different levels of motion are present, and when there is a transition from no motion to fast motion. Moreover, the system should be compatible with existing digital video encoding standards including the Motion Picture Expert's Group (MPEG) standard, details of which can be found in document ISO/IEC JTC1/SC29/WG11 N0702, entitled "Information Technology—Generic Coding of Moving Pictures and Associated Audio, Recommendation H.262," Mar. 25, 1994, incorporated herein by reference.

The MPEG system includes three types of video pictures; specifically, the intra-coded picture (I-picture), predictive-coded picture (P-picture), and bi-directionally predictive-coded picture (B-picture). Furthermore, either frame or field structure video sequences are accommodated. An I-picture completely describes a single video picture without reference to any other picture. For improved error concealment, motion vectors can be included with an I-picture. An error in an I-picture has the potential for greater impact on the displayed video since both P-pictures and B-pictures in the base layer are predicted from I-pictures. P pictures are predicted based on previous I or P pictures. The reference is from an earlier I or P picture to a future P-picture and is known as forward prediction. B-pictures are predicted from the closest earlier I or P picture and the closest later I or P picture.

An advantageous scene detection system would also provide automatic control of the rate control and adaptive quantization processes of video compression encoders which use various standards, including MPEG-1, MPEG-2, ISO/IEC H.261 (videoconferencing), and ISO/IEC H.263. Moreover, the system should also be compatible with various color television broadcast standards such as the National Television Standards Committee (NTSC) standard, used in North America, and the Phase Alternating Line (PAL) standard, used in Europe, and should further be compatible with both frame and field mode video. The present invention provides a system having the above and other advantages.

SUMMARY OF THE INVENTION

In accordance with the present invention, a method and apparatus are presented for detecting a scene change between a prior picture and a current picture in a sequence of video pictures.

In a method for detecting a scene change between a prior video picture and a current video picture, an average luminance value is determined for a block pair of the prior and current video pictures. Preferably, the blocks of the block pair are located, respectively, in the same relative position in the prior and current pictures. Next, an incremental visual sensation value is determined using a difference between the average luminance values. If the incremental visual sensation value exceeds a block contrast threshold level, a scene change is indicated. The block contrast threshold level may be approximately fifteen to twenty-five times a Weber fraction constant defined herein.

In particular, a minimum of the average luminance values of the current and prior picture blocks is determined, where, if the minimum exceeds a dark scene threshold, the incremental visual sensation value is determined using the ratio of (a) the absolute value of the difference between the average luminance values, and (b) the minimum of the average luminance values of the current and prior picture blocks. Otherwise, the incremental visual sensation value is determined using the ratio of (a) the absolute value of the difference, and (b) the dark scene threshold. The dark scene threshold may be approximately 10% of a maximum gray level.

Additionally, the difference between the average luminance values may be determined for a plurality of block pairs of the prior and current video pictures. Preferably, every block pair in the pictures are used to provide an overall picture scene change determination. The incremental visual sensation value is determined for each of the block pairs using the differences, where, if the incremental visual sensation value exceeds the block contrast threshold level for a threshold proportion of block pairs in the current and prior video pictures, a scene change is indicated. This threshold proportion may be approximately 80% to 90%.

Furthermore, the method may be adaptively optimized by determining a relative amount of motion between the blocks of the block pair, and adjusting a size of the blocks based on the relative amount of motion. In particular, the size of the blocks is increased as the relative amount of motion increases. Moreover, the relative amount of motion can be found by determining a sum of the absolute value of a horizontal motion vector and the absolute value of a vertical motion vector, where the horizontal and vertical motion vectors are indicative of horizontal and vertical motion, respectively, of a video image of the current picture block relative to a video image of the prior picture block. A determination is then made to see if the sum exceeds a motion threshold. The motion threshold may be adjusted according to a picture type of the current picture (e.g., whether the current picture is an I, P or B picture).

A corresponding apparatus is also presented.

DETAILED DESCRIPTION OF THE INVENTION

A method and apparatus are presented for detecting scene changes in a sequence of digital video frames.

The brightness level of a scene is determined by the average luminance of the pixels which comprise the scene, and the dynamic range of the luminance values of the pixels. Moreover, the visual sensation of brightness to the human eye is generally considered to be a function of the natural logarithm of image luminance. At a frame and/or field of a scene change, the visual sensation of brightness is changed significantly from the previous frame or previous corresponding field.

Furthermore, since human perception is more sensitive to a luminance contrast rather than the absolute luminance values themselves, the incremental visual sensation $\delta C$ between two scenes is a good indicator of a scene change. $\delta C$ is defined as the differential value of the average brightness of a region (e.g., block) which has the same relative position in the two frames and/or fields.

In particular, according to Weber's law, if the luminance $b_0$ of an object is just noticeably different from the luminance $b_s$ of a surrounding region, then the following ratio known as the Weber fraction can be defined:

$$\frac{|b_s - b_0|}{b_0} = \hat{C} = \text{constant.}$$

The Weber fraction remains approximately constant at high background luminance levels, e.g., greater than 0.5 mL (milliLumens). The value of the constant $\hat{C}$ has been found to be 0.02, which means that, on a scale of 0 to 1, at least fifty different luminance levels are required for the contrast between levels to be perceptible by a human.

Denoting $b_0 = b$, one can write $b_s = b + \delta b$, where $\delta b$ is the smallest perceptible luminance change. Then, $$\frac{\delta b}{b} = d(\log_e b) = \delta C \text{ (constant)}$$

which indicates that $$\frac{|b_s - b_0|}{b_0}$$

is proportional to the incremental visual sensation of brightness.

Figure 1:
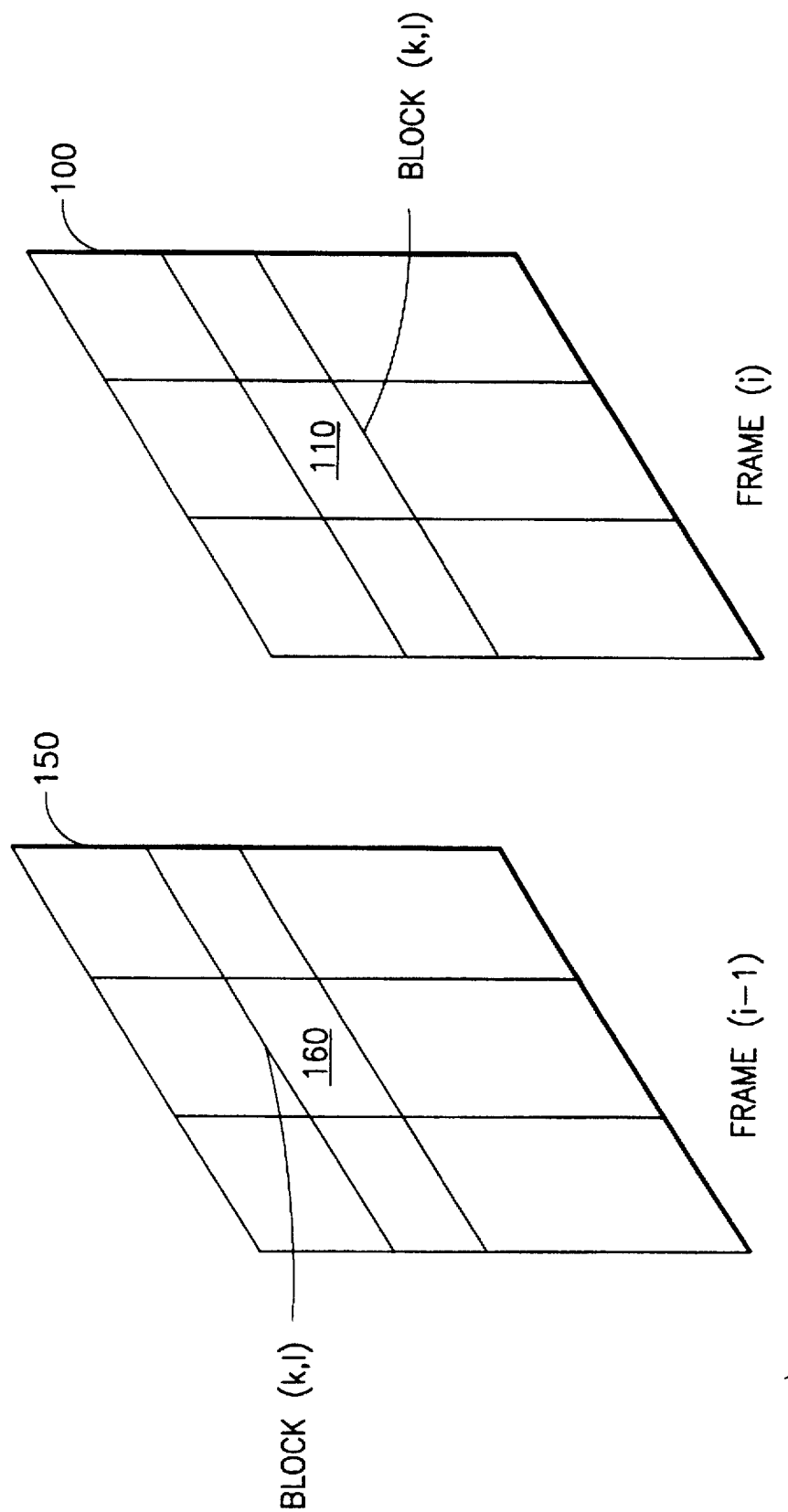
FIG. 1 illustrates a comparison between blocks of two consecutive video frames in accordance with the present invention.

FIG. 1 illustrates a comparison between blocks of two consecutive video frames in accordance with the present invention. A current frame, Frame (i), shown at 100, includes a block 110. A previous frame, Frame (i−1), shown at 150, includes a block 160 which is located in the same relative position in the frame 150 as block 110 is located in frame 100.

For instance, with an NTSC format, the frames 100 and 150 may each comprise thirty slices, with each slice having forty-four macroblocks. Thus, an entire NTSC frame comprises 1,320 macroblocks. Moreover, a macroblock typically comprises a 16×16 block of pixels which, in the MPEG-2 standard, for example, is comprised of four 8×8 pixel blocks. Thus, an NTSC frame may comprise 44×16=704 pixels in width, and 30×16=480 pixels in height, for a total of 337,920 pixels. Furthermore, the present invention is compatible with the PAL format, which includes 1,584 macroblocks in 36 slices, with 44 macroblocks per slice, and 16×16 pixels per macroblock.

Blocks 110 and 160 are designated by the coordinate set (k,l), where k is the horizontal index of the block, and l is the vertical index. Furthermore, each of the blocks 110 and 160 may have a size, for example, of 16 pixels in height by 32 pixels in width. In this case, k will range from 1 to 704/32=22, and l will range from 1 to 480/16=30. The following terms are defined:

| | |
|---|---|
| h | height of frame (pixels) |
| w | width of frame (pixels) |
| m | height of block (pixels) |
| n | width of block (pixels) |
| i | frame index |
| k | horizontal block index (k = 1, . . ., h/m) |
| l | vertical block index (l = 1, . . ., w/n) |
| $X_{i,k,l}$ | pixel intensity of ith frame, kth horizontal block, lth vertical block |

Thus, we have two consecutive frames and/or two top (or bottom) fields which are defined by a set of pixels. In particular, the (i)th frame, frame 100, is defined by a set of pixels $X_{i,k,l}$, and the (i−1)th frame, frame 150, is defined by a set of pixels $X_{i-1,k,l}$. In order to effectively distinguish a scene change, each frame is partitioned into a set of k×l disjoint blocks, with each block having m×n pixels.

Note that the size of the block can be programmed to adaptively change based on the current motion information. In particular, the faster the motion is, the larger the block size m×n should be. One way to adjust the block size for each frame based on the amount of motion is by performing pre-processing as follows. First, an index v[x] [y] is computed for each 16×16 macroblock, where x=1, 2, . . . , [w/16], and y=1, 2, . . . , [h/16]. If the full pixel forward motion vector, vector [x] [y] [z], satisfies the following inequality:

|vector [x] [y] [0] |+| vector [x] [y] [1]|>T$_3$, then a fast motion between the two blocks is indicated. Vector[x] [y] [0] and vector[x] [y] [1] are the horizontal and vertical motion vectors, respectively, of a current frame block (e.g., block (x, y)) relative to a prior frame block. Thus, if the inequality is met, set the index v[x] [y]=1; otherwise, set v[x] [y]=0.

Note that the motion vectors vector [x] [y] [z] are obtained from the closest available picture with the same picture type. For example, if the current picture type is a P-picture, then motion vectors vector [x] [y] [z] are motion vectors of the previous predicted P-picture. This is true since the scene change detection for each picture occurs before the motion estimation of the picture.

The threshold T$_3$ is selected based on the different picture types which are present in the sequence of video frames. For example, if there are no B-pictures in the bitstream, e.g., with the sequence I, P, P, . . . , then T$_3$=16 is an appropriate choice. If there is one B-picture present, e.g., with the sequence P, B, P, B, . . . , then T$_3$=16 is an appropriate choice if the current picture is a B-picture, and T$_3$=32 is an appropriate choice if the current picture is a P-picture, and so forth.

Next, the block size is adjusted accordingly. An initial (default) block size of 16×16 may be used. Then, the block size may be adjusted based on v[x] [y]. For example, if v[x] [y]=1, then the block size may be increased, e.g., to 16×32 or 32×32. Similarly, if v[x] [y]=0, then the block size may be decreased, e.g., to 8×16. However, note that the is block size should not be increased such that the block crosses over the right and/or bottom boundary of a macroblock. Generally, the block size should be larger when the motion is faster. Moreover, the largest allowed block size may be limited in some applications to 32×48 pixels.

Next, the average luminance of each block in a frame (or top field) is determined. For the (i)th frame, block (k,l), the average luminance is:

$$B_{i,k,l} = \frac{1}{mn} \sum_{c1=0}^{m-1} \sum_{c2=0}^{n-1} X_{i,kk+c1,lw+c2},$$

for k=1, . . . h/m, and l=1, . . . , w/n. c1 and c2 are dummy counting indexes. Next, the block-luminance-increment δB$_{i,k,l}$ between the (i)th and (i−1) frames (or top fields) is determined by:

δB$_{i,k,l}$=B$_{i,k,l}$−B$_{i-1,k,l}$.

Furthermore, the relative block-incremental-contrast δC$_{i,k,l}$ for the (i)th frame, block (k, l), can be defined by:

$$\delta C_{i,k,l} = \begin{cases} \frac{|\delta B_{i,k,l}|}{\min\{B_{i,k,l}, B_{i-1,k,l}\}}, & \text{for } \min\{B_{i,k,l}, B_{i-1,k,l}\} > T_0; \\ \frac{|\delta B_{i,k,l}|}{T_0}, & \text{for } \min\{B_{i,k,l}, B_{i-1,k,l}\} \leq T_0. \end{cases}$$

T$_o$ is a threshold which indicates that a scene is considered to be a dark scene. Generally, T$_o$=25.5 may be used, which is 10% of the maximum gray scale level 255.

For a scene change, a significant threshold T, of the relative change of block luminance contrast is set as: T$_1$=15−25 C̄. Now, consider an index array, index[k] [l], for k=1, . . . , h/m, l=1, . . . , w/n, defined by:

$$\text{index}[k][l] = \begin{cases} 1, & \text{if } \delta C_{i,k,l} > T_1. \\ 0, & \text{Otherwise}. \end{cases}$$

Then, if approximately 80–90% of the blocks in a frame have a relative block-incremental-contrast which is greater than the significant threshold, i.e., $$\sum_{k=1}^{\lfloor h/m \rfloor} \sum_{l=1}^{\lfloor w/n \rfloor} \text{index}[k] \frac{[l]}{\lfloor h/m \rfloor \lfloor w/n \rfloor} > T_2, \text{ where } T_2 = 80\%\text{–}90\%,$$

then, in accordance with the present invention, a scene change is indicated. The range of 80–90% was determined based on extensive testing, but the actual optimal figure may vary with the particular scene. Note that the mathematical expression ⌊x⌋ denotes rounding of the non-integer x to the next lowest integer.

Figure 2:
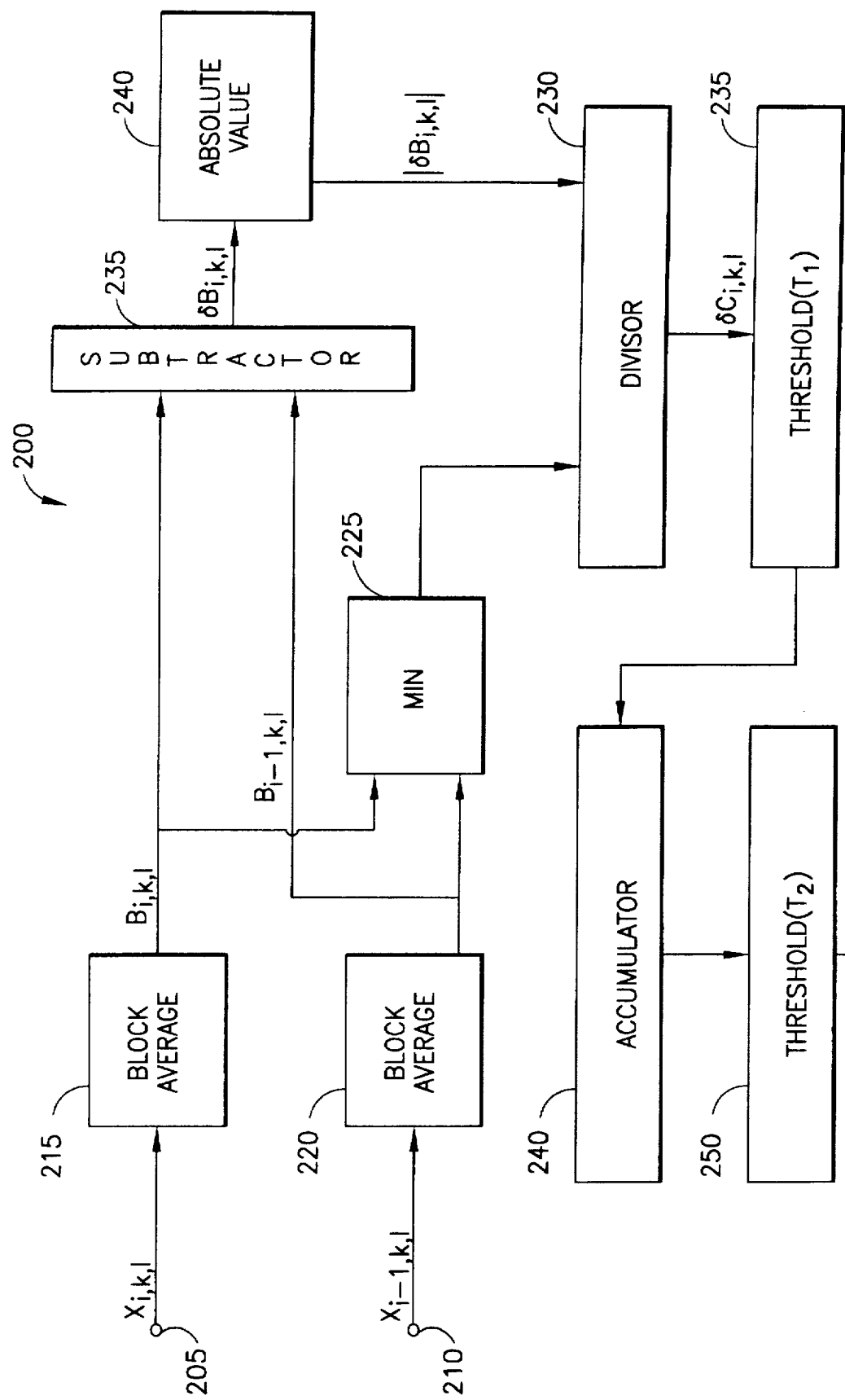
FIG. 2 is a block diagram of a scene change detector in accordance with the present invention.

FIG. 2 is a block diagram of a scene change detector in accordance with the present invention. The detector, shown generally at 200, includes input terminals 205 and 210. At input terminal 205, pixel data from the current frame, X$_{i,k,l}$, is received and provided to a block average function 215 to produce the average luminance value for each block in the ith frame, B$_{i,k,l}$. Similarly, at input terminal 210, pixel data from the previous frame, X$_{i-1,k,l}$, is received and provided to a block average function 220 to produce the average luminance value for each block in the (i−1)th frame, B$_{i-1,k,l}$.

Minimizer unit (MIN) 225 determines min{B$_{i,k,l}$, B$_{i-1,k,l}$} and outputs this term to a divisor function 230. Meanwhile, subtractor 235 determines δB$_{i,k,l}$=B$_{i,k,l}$−B$_{i-1,k,l}$. Absolute value function 240 determines |δB$_{i,k,l}$|, and provides this term to the divisor 230. The divisor 230 determines the relative block-incremental-contrast δC$_{i,k,l}$ for the (i)th frame, block (k, l), depending on whether min{B$_{i,k,l}$, B$_{i-1,k,l}$}>T$_o$. δC$_{i,k,l}$ is then provided to a threshold function 235 which determines whether block (k, l) is indicative of a scene change (e.g., whether δC$_{i,k,l}$>T$_1$). If so, an index[k] [l] may be set accordingly. Accumulator 240 accumulates the scene change result for each block, and sums the result over the entire frame or a portion thereof. Finally, threshold function 250 receives the summed result from accumulator 240, and uses the threshold T$_2$ to determine whether a scene change for the overall frame is indicated.

The scene change detection system of the present invention was tested extensively using different video sequences. In particular, the "Football", "Mobile Calendar", "Flower Garden", and "Table Tennis" video sequences described in Test Model Editing Committee, "Test Model 5", ISO/IEC JTC1/SC29/WG11 MPEG93/457, April 1993, were analyzed, along with the "Destruct", "Street Organ", "Silent", and "Fun Fair" video sequences, described in the Ad hoc group on MPEG-4 video VM editing, "MPEG-4

Video Verification Model Version 3.0", ISO/IEC JTC1/SC29/WG11 N1277, Tampere, Finland, July 1996.

Sample test results of the scene detection system of the present invention are shown in Table 1, below. The thresholds were selected as $T_1=0.3$ and $T_2=0.85$, and the block size was m=16, n=32. The particular video sequence is identified in the first column. The sequence of frames involved is indicated in the second column. For example, [0.50] indicates that frames 0 through 50 were analyzed for a scene change. The third column indicates whether a scene change was detected, and if so, in which frames. For example, a scene change in a third frame means that a scene change between the second and third frames was detected. The fourth column, if applicable, provides additional information on the nature of the video sequence.

TABLE 1

| Sequences | Frames | Scene Change | Comments |
|---|---|---|---|
| Football | [0:50] | No | Fast motion |
| Mobile Calendar | [0:44] | No | |
| Street Organ | [0:50] | No | |
| Silent | [0:50] | No | No motion to motion |
| Flower Garden | [0:30] | No | Camera panning |
| Fun Fair | [0:50] | No | Fast motion |
| Table Tennis | [90:100] | 97th | |
| Destruct | [0:40] | 25th, 26th | A bright light |
| Combination of any two sequences | | Yes | scene change detected every time |

Moreover, for frames in the above video sequences in which a scene change was detected, coding efficiency was examined using the MPEG-2 WG-11 programs. Coding efficiency is measured by determining the number of bits generated by the coding method to achieve a given image quality. Specifically, for a constant quality level, fewer coding bits are indicative of higher coding efficiency. It was determined that, if a frame with a scene change detected in accordance with the present invention is coded as a P-picture type, then more than 46% of the macroblocks are coded as I-pictures. Thus, the scene detection system of the present invention was found to operate as expected since it successfully located frames which are difficult to efficiently code using predictive coding. Advantageously, such frames can be coded as I-pictures since the rate control engine of the encoder allocates more bits for I-pictures, thereby also improving image quality.

Generally, in a typical encoder, such as an MPEG-2 encoder using the Test Model 5 standard, there is a process for selecting a macroblock coding type for each macroblock of a P-picture or B-picture. Such a process will determine whether the macroblock should be coded as an intra-coded block (I-coded) or non-intra-coded block (P- or B-coded) based on which coding type provides better quality or uses fewer data bits. For a P-picture or B-picture, if the prediction is efficient, only a small proportion of macroblocks in a picture will be I-coded (e.g., less than five per cent). This is desirable as I-coded blocks consume a relatively large number of data bits since there is no temporal compression.

If the proportion of I-coded macroblocks in a picture is greater than, e.g., thirty or forty per cent, then the picture quality will be poor. In this case, prediction coding is inefficient for the picture, as would be expected at a scene change. Thus, when a scene change occurs, it is generally desirable that the first frame of the new scene should not be coded as a P-picture.

Although the invention has been described in connection with various specific embodiments, those skilled in the art will appreciate that numerous adaptations and modifications may be made thereto without departing from the spirit and scope of the invention as set forth in the claims. For example, the various threshold levels set forth herein may be adjusted according to the particular scene or video sequence which is analyzed. That is, some types of video sequences, such as action movies, may be characterized by more frequent and pronounced scene change activity. Moreover, specific lighting conditions may be associated with a particular video sequence, e.g., such as a horror film, where lighting levels may be relatively low throughout the sequence. In this case, the scene change detection is thresholds can be adjusted accordingly.

Moreover, it may be desirable to analyze only a portion of a video picture to determine a scene change, or different portions may be analyzed using different thresholds. For instance, in a video sequence of a landscape scene with a relatively dark earth at the bottom part of the picture and a relatively bright sky at the top part of the picture, a more sensitive scene change threshold may be used for the bottom part of the picture. Similarly, different sized blocks may be used in different regions of a picture. For instance, when motion is more prevalent toward the middle of a picture than toward the edges, larger block sizes may be used in the middle of the picture.

We claim:

1. A method for detecting a scene change between a prior video picture and a current video picture, comprising the steps of:

determining average luminance values of a block pair of said prior and current video pictures;

determining an incremental visual sensation value using a difference between said average luminance values;

determining a minimum of said average luminance values of said current and prior picture blocks, wherein:

if said minimum exceeds a dark scene threshold, said incremental visual sensation value is determined using the ratio of (a) the absolute value of said difference, and (b) said minimum;

if said minimum does not exceed a dark scene threshold, said incremental visual sensation value is determined using the ratio of (a) the absolute value of said difference, and (b) said dark scene threshold; and if said incremental visual sensation value exceeds a block contrast threshold level, a scene change is indicated.

2. The method of claim 1, wherein said block contrast threshold level is approximately fifteen to approximately twenty-five times a Weber fraction constant.

3. The method of claim 1, wherein said blocks of said block pair are located, respectively, in the same relative position in said prior and current pictures.

4. The method of claim 1, wherein:

said dark scene threshold is approximately 10% of a maximum gray level.

5. The method of claim 1, wherein:

said difference between average luminance values is determined for a plurality of block pairs of said prior and current video pictures; and said incremental visual sensation value is determined for each of said block pairs using said differences; wherein:

if said incremental visual sensation value exceeds the block contrast threshold level for a threshold proportion of block pairs in said current and prior video pictures, a scene change is indicated.

6. The method of claim 5, wherein said threshold proportion is approximately 80% to approximately 90%.

7. An apparatus for detecting a scene change between a prior video picture and a current video picture, comprising:

means for determining average luminance values of a block pair of said prior and current video pictures;

means for determining an incremental visual sensation value using a difference between said average luminance values;

means for determining a minimum of said average luminance values of said current and prior picture blocks, wherein:
  if said minimum exceeds a dark scene threshold, said incremental visual sensation value is determined using the ratio of (a) the absolute value of said difference, and (b) said minimum;
  if said minimum does not exceed a dark scene threshold said incremental visual sensation value is determined using the ratio of (a) the absolute value of said difference, and (b) said dark scene threshold; and
  if said incremental visual sensation value exceeds a block contrast threshold level, a scene change is indicated.

8. The apparatus of claim 7, wherein said block contrast threshold level is approximately fifteen to approximately twenty-five times a Weber fraction constant.

9. The apparatus of claim 7, further comprising:

means for determining said difference between average luminance values for a plurality of block pairs of said prior and current video pictures; and means for determining said incremental visual sensation value for each of said block pairs using said differences; wherein:
  if said incremental visual sensation value exceeds the block contrast threshold level for a threshold proportion of block pairs in said current and prior video pictures, a scene change is indicated.

10. The apparatus of claim 9, wherein said threshold proportion is approximately 80% to approximately 90%.

11. The apparatus of claim 7, wherein: said dark scene threshold is approximately 10% of a maximum gray level.

12. A method for detecting a scene change between a prior video picture and a current video picture, comprising the steps of:

determining average luminance values of a block pair of said prior and current video pictures;

determining an incremental visual sensation value using a difference between said average luminance values;

determining a relative amount of motion between said blocks of said block pair; and adjusting a size of said blocks based on said relative amount of motion; wherein:

if said incremental visual sensation value exceeds a block contrast threshold level, a scene change is indicated.

13. The method of claim 12, wherein the size of said blocks is increased as said relative amount of motion increases.

14. The method of claim 12, wherein said step of determining a relative amount of motion comprises the further steps of:

determining a sum of the absolute value of a horizontal motion vector and the absolute value of a vertical motion vector;

wherein said horizontal and vertical motion vectors are indicative of horizontal and vertical motion, respectively, of a video image of said current picture block relative to a video image of said prior picture block; and determining if said sum exceeds a motion threshold.

15. The method of claim 14, wherein:

said motion threshold is adjusted according to a picture type of said current picture.

16. An apparatus for detecting a scene change between a prior video picture and a current video picture, comprising:

means for determining average luminance values of a block pair of said prior and current video pictures;

means for determining an incremental visual sensation value using a difference between said average luminance values;

means for determining a relative amount of motion between said blocks of said block pair; and means for adjusting a size of said blocks based on said relative amount of motion; wherein:
  if said incremental visual sensation value exceeds a block contrast threshold level, a scene change is indicated.

17. The apparatus of claim 16, further comprising:

means for increasing the size of said blocks as said relative amount of motion increases.

18. The apparatus of claim 16, wherein said means for determining a relative amount of motion further comprises:

means for determining a sum of the absolute value of a horizontal motion vector and the absolute value of a vertical motion vector;

wherein said horizontal and vertical motion vectors are indicative of horizontal and vertical motion, respectively, of a video image of said current picture-block relative to a video image of said prior picture block; and means for determining if said sum exceeds a motion threshold.

19. The apparatus of claim 18, further comprising:

means for adjusting said motion threshold according to a picture type of said current picture.

* * * * *